May 26, 1970     J. A. ENGLISH     3,513,989
HIGH SPEED TRANSFER DEVICE
Filed Dec. 21, 1967
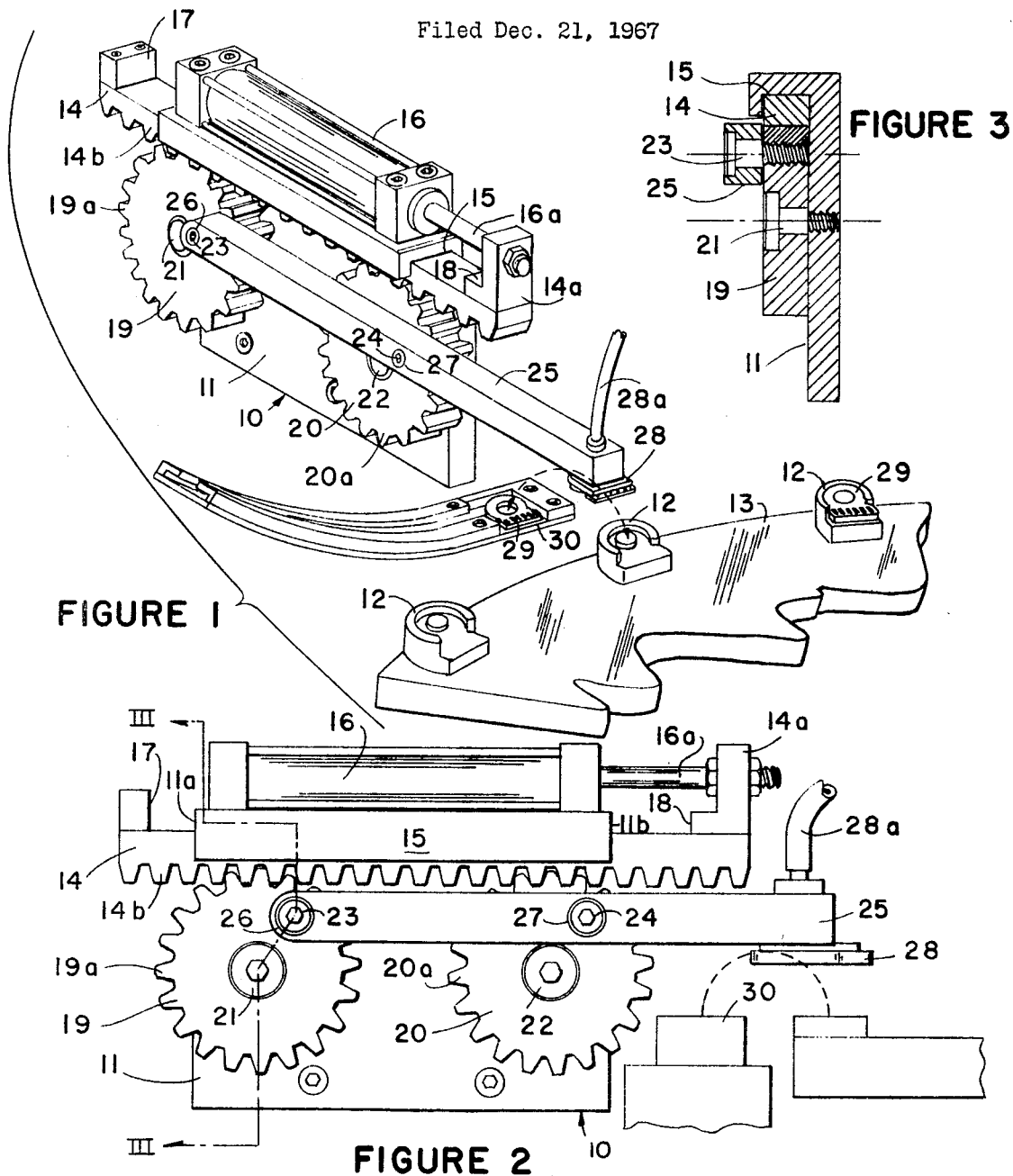
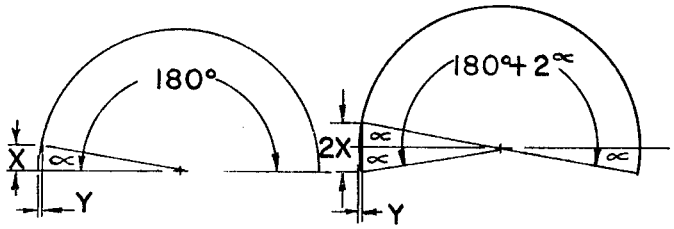
FIGURE 4     FIGURE 5
INVENTOR
JACK A. ENGLISH
BY 
ATTORNEY

United States Patent Office 3,513,989
Patented May 26, 1970

3,513,989
HIGH SPEED TRANSFER DEVICE
Jack A. English, Elkhart, Ind., assignor to CTS Corporation, Elkhart, Ind., a corporation of Indiana
Filed Dec. 21, 1967, Ser. No. 692,503
Int. Cl. B66c 1/02
U.S. Cl. 214—1
6 Claims

ABSTRACT OF THE DISCLOSURE

A high speed transfer device having a transfer bar for picking up a part from a stationary station and transferring the part to a movable station. The transfer bar is connected to and driven by a pair of crank pins rotated through a predetermined angle by a gear rack. Power means imparts reciprocating movement to the gear rack and drives the transfer bar through a predetermined angle of approximately 180°.

---

The present invention relates to a transfer device and, more particularly, to a transfer device for picking up a part at a stationary station and transferring the part to a work nest at a movable station. Transfer devices are currently used in a variety of automatic assembly machines, such as, riveting, staking, and punching machines, and in other automatic and semiautomatic equipment requiring the transfer of parts to work nests of automated equipment.

The prior art is replete with transfer devices for picking up and placing a part onto a station defined by a work nest of a movable table or the like. The complexity of such transfer devices is necessitated by the sequential changes in movement of a part as it is transferred from the stationary station to the movable station. Preferably a part is initially moved vertically and, after clearing the stationary station, the part is transferred laterally until the part is above the movable station. The part is then lowered vertically into a work nest located at the movable station. Most prior art transfer devices comprise an arm movable on a vertical guide for effecting the desired motion of the free end of the arm. Such transfer devices, although satisfactory for some applications, contain a large number of complex elements subject to wear that frequently must be repaired and adjusted in order to maintain proper alignment of the transfer device with respect to a stationary station and a movable station. It would, therefore, be desirable to provide a transfer device having a minimum number of elements, operable in a simple and facile manner, and not subject to appreciable wear.

As the speed of an automatic assembly machine used with a transfer device is increased, it is necessary that the speed of transferring a part to a work nest on the automatic assembly machine also be increased. The operating speed of many prior art transfer devices is limited because of the inertial forces associated with the complex elements of the transfer device, the inertial forces being dependent on both the mass and instantaneous acceleration of the elements. As the direction of movement of a transfer element holding a part abruptly changes from vertical to lateral and then back to vertical, objectionably large inertial forces are created. It would, therefore, also be desirable to increase the transfer speed of parts to a work nest by providing a transfer device wherein the free end of a driven member or transfer bar is oscillated through an arc when picking up and placing a part in a work nest thereby to reduce the instantaneous acceleration of the transfer bar at its limits of travel and accordingly reduce the inertial forces attributable to such acceleration.

Accordingly, it is an object of the present invention to provide an improved transfer device. Another object of the present invention is to provide a transfer device having a minimum number of movable elements so as to reduce the movable mass of the device and permit a high transfer speed of the device. An additional object of the present invention is to provide a high speed transfer device for converting rectilinear reciprocating motion of a driving member to arcuate oscillating motion of a driven member. An additional object of the present invention is to provide a high speed transfer device for moving a part in an arcuate motion from a stationary station to a work nest carried by a movable station without changing the relative attitude of the part as the part is picked up and placed in the work nest. Further objects and advantages of the present invention will become apparent as the following description proceeds, and the features of novelty characterizing the invention will be pointed out with particularity in the claims annexed to and forming a part of this specification.

Briefly, the present invention is concerned with a high speed transfer device comprising a gear rack and a pair of spaced gears mounted on a frame for converting rectilinear motion of the rack to arcuate motion of a transfer bar connected to the gears. The transfer bar is provided with means for picking up a part from a stationary station and transferring the part to a work nest at a movable station.

For a better understanding of the present invention, reference may be had to the accompanying drawings wherein the same reference numerals have been applied to like parts and wherein: FIG. 1 is an isometric view of an improved transfer device showing a part being transferred from a stationary station to a work nest carried by a movable station; FIG. 2 is a front view of the transfer device shown in FIG. 1; FIG. 3 is a fragmentary sectional view taken along lines III—III of FIG. 2; and FIGS. 4 and 5 show paths of 180 and 180+α degrees generated by the part as it moves from the stationary station to a work nest on a movable station.

Referring now to the drawings, the high speed transfer device, generally designated at 10, comprises a frame 11 fixedly secured to a stationary surface. Adjacent to the frame and in spaced relationship thereto, a plurality of work nests 12 are fixedly secured to the periphery of an indexing dial 13 such as disclosed in application Ser. No. 512,485, filed on Dec. 8, 1965 and assigned to the same assignee as the present invention. A driving member 14, e.g., a gear rack, is slideably supported in an elongated channel 15 provided in the frame 11 and power means 16, such as an air cylinder or an electromagnetic device, having a movable member 16a operably connected to the rack in a suitable manner such as by a cracket 14a, reciprocates the rack rectilinearly in the slot. Forward and rearward motion of the driving member 14 is limited by stop members 17 and 18 extending upwardly from the driving member at opposite ends thereof and abuttable against the ends 11a and 11b (see FIG. 2) of the frame 11. A pair of spaced gears 19 and 20 are rotatably mounted on shafts or pintles 21 and 22 secured to the frame 11 and the teeth 19a and 20a of the gears mesh with and are driven by the teeth 14b of the rack. Although a pair of pintles 21 and 22 are fixedly secured to the frame for rotatably supporting the gears, bearings could be provided in the frame for rotatably supporting shafts fixedly secured to each of the gears.

In one form of the invention, crank pins 23 and 24 are fixedly secured to each of the gears, and a transfer bar 25 is provided with a pair of spaced openings 26 and 27 receiving the crank pins. Pick-up means 28 secured to one end of the transfer bar and appropriately designed, picks up a part 29 of a component from a stationary station 30 with suction means connected to suction hose 28a and transfers the part 29 to one of the work nests 12. By driving the gears through a predetermined angle of 180° with the rack, the path through which the part moves is semicircular; therefore, pickup and placement of the part occurs with upward, lateral, and downward movement. It will be appreciated, however, that such movement is not characterized by abrupt changes in direction and large magnitudes of acceleration. Therefore, the speed of transferring the part can be increased considerably without causing excessive noise or wear as would generally happen if the movement were characterized by abrupt changes in direction.

The lateral transfer distance of the part or, in other words, the distance between the center of the stationary station and the center of the work nest is preferably twice the throw of the crank pins. By having the throw of the crank pins equal to each other, the vertical amplitude of the transfer path is equal to the throw. By decreasing the throw of the crank pin 23 on the gear 19, and by having the crank pin 23 received in a not-shown elongated slot provided in the transfer bar 25, the ratio of the vertical amplitude to the horizontal amplitude of the transfer path can be modified to any desired value. When initial and final vertical movement of the part is critical, angular rotation of the gears 19, 20 is increased slightly in excess of 180° to improve vertical pickup and placement of the part. With angular rotation of the gears equal to 180°, effective vertical movement of a distance X (see FIG. 4) is limited by and proportional to a maximum permissible horizontal movement Y, but, by increasing angular rotation from 180 to 180+2∝ degrees, vertical movement is doubled without increasing horizontal movement. In accord with the present invention, when it is necessary to increase the effective vertical movement up to a maximum of 2X without increasing the horizontal movement Y, the gears can be rotated through an angle of 180+2∝ degrees as shown in FIG. 5. Thus even though the transfer path is arcuate or semicircular, a very effective and useful vertical pickup is obtained when the part is to be picked up a distance of 2X without being moved a horizontal distance in excess of Y.

Obviously many other changes and modifications falling within the true spirit and scope of the present invention can be made to alter the transfer path of the part from the pickup station to the work nest. It will be understood therefore that various modifications and alterations may be made to the presently illustrated form of the invention without in any manner departing from the spirit or scope of the present invention. It is to be understood, therefore, that I intend by the appended claims to cover all such modifications as fall within the true spirit and scope of the present invention.

What I claim as new and desire to secure by Letters Patent in the United States is:

1. A high speed transfer device comprising a frame, a pair of spaced crank pins supported for movement relative to the frame, a gear rack slideably guided by the frame, a pair of spaced gears rotatably supported by the frame and carrying the crank pins, each of the gears meshing with the gear rack for cyclically moving the crank pins through a predetermined angle between first and second positions, driven means connected to the crank pins, part pick-up means carried by the driven means for picking up a part at one station when the crank pins are in the first position and placing the part in a work nest on another station when the crank pins are in the second position, and power means for reciprocating the gear rack and driving the gears through the predetermined angle for transferring the part from the one station to the work nest of the other station.

2. The transfer device of claim 1 wherein the pair of crank pins have identical throws for imparting an arcuate movement to the part pick-up means, the crank axes of the crank pins being spaced apart a distance greater than the throw.

3. The transfer device of claim 1 wherein reciprocating movement of the rack drives the spaced gears back and forth through a predetermined angle of at least approximately 180°.

4. The transfer device of claim 1 wherein a pair of stop members are secured to opposite ends of the gear rack engageable with the frame for limiting forward and rearward motion of the gear rack and accordingly driving the spaced gears back and forth through a predetermined angle.

5. The transfer device of claim 4 wherein the pick-up means comprises suction means for picking up a part at the one station.

6. A high speed transfer device for moving a part from a first station to a second station, said transfer device comprising a frame, a gear rack supported on the frame for producing a reciprocating motion, gear means driven by the gear rack, a pair of crank pins connected to the gear means for converting the reciprocating motion of the gear rack to an oscillating arcuate motion, the crank axes of the crank pins being spaced apart a distance greater than the throw of each of the crank pins, an oscillating driven means, a part pickup means mounted on said driven means, said driven means being connected to the pair of crank pins and moving from a first position to permit picking up a part at said first station, moving the part through an arcuate transfer path of approximately 180°, depositing the part on said second station, and returning to said first position, and power means for reciprocating the gear rack and driving the gear means for transferring the part through the arcuate transfer path.

References Cited

UNITED STATES PATENTS

| 1,243,407 | 10/1917 | Hawthrone. | |
| 2,314,686 | 3/1943 | Brosius | 78—96 |
| 2,833,426 | 5/1958 | Bosken. | |
| 3,091,347 | 5/1963 | Sehn. | |
| 3,324,986 | 6/1967 | Dierksheide | 198—20 |

FOREIGN PATENTS

| 370,099 | 6/1963 | Switzerland. |
| 555,494 | 1/1957 | Italy. |

GERALD M. FORLENZA, Primary Examiner

G. F. ABRAHAM, Assistant Examiner

U.S. Cl. X.R.

214—147